United States Patent [19]

Nagy et al.

[11] 4,174,644
[45] Nov. 20, 1979

[54] TRANSMISSION AND SHIFT LINKAGE

[75] Inventors: Laszlo Nagy, St. Clair Shores; Donald J. Pulk, Rochester, both of Mich.

[73] Assignee: General Motors Corporation, Detroit, Mich.

[21] Appl. No.: 892,954

[22] Filed: Apr. 3, 1978

[51] Int. Cl.² .......................... G05G 5/10; G05G 9/18
[52] U.S. Cl. ...................................... 74/477; 74/339; 74/475; 74/476
[58] Field of Search ..................... 74/473 R, 475, 476, 74/477, 331, 339

[56] References Cited

U.S. PATENT DOCUMENTS

| | | | |
|---|---|---|---|
| 1,134,681 | 4/1915 | King . | |
| 2,227,273 | 12/1940 | Price | 74/335 |
| 2,497,930 | 2/1950 | Creson | 74/473 |
| 2,535,381 | 12/1950 | Andrews | 74/473 |
| 2,667,082 | 1/1954 | Brock et al. | 74/477 |
| 2,748,910 | 6/1956 | Klecker | 192/3.5 |
| 3,264,895 | 8/1966 | Turunen | 74/477 |
| 3,541,879 | 11/1970 | Ravenel | 74/477 |
| 3,857,299 | 12/1974 | Morrison | 74/473 R |

FOREIGN PATENT DOCUMENTS

1053353  12/1966  United Kingdom .

*Primary Examiner*—Allan D. Herrmann
*Attorney, Agent, or Firm*—A. M. Heiter

[57] ABSTRACT

A transmission having four forward gearsets and reverse gearing on one side of the forward gearsets. First and second shift members are mounted on the other side of the forward gearing for axial shifting movement to selectively engage the forward gearsets. A shift shaft having a shift lever is mounted transversely of the forward gearsets for axial selecting movement and rotary shifting movement. A reverse shift member is centrally pivotally mounted on the shift shaft, engages a guide to prevent axial movement, and has one end adjacent the other shift members and the other end shifting the reverse gearing. The shift shaft, on selecting movement to first, second, and third neutral positions, respectively engages the shift lever with the reverse, first and second shift members and on shifting movement, when the reverse shift member has been selected, shifts to reverse drive; when the first shift member has been selected, shifts to first or second drive; and when the second shift member has been selected, shifts to third or fourth drive. An interlock member is mounted on the shift shaft for axial selecting movement with the shift shaft, engages a guide to prevent rotary movement and engages and prevents shifting movement of the shift members not engaged by the shift lever. A shift movement detent is provided between the interlock member and shift shaft.

11 Claims, 15 Drawing Figures

TRANSMISSION AND SHIFT LINKAGE

This invention relates to transmissions and particularly to a transmission and shift linkage.

This invention provides a transmission and simple internal linkage construction and arrangement for selecting the neutral position for each group of drives and shifting the transmission selectively to each one of a plurality of forward ratio drives and reverse drive with a positive interlock to ensure engagement of one drive and disengagement of the other drives. The selecting movement to reverse position is inhibited and the shifting movement is detented in neutral and each shift position.

This invention provides an internal shift linkage having a simple construction and arrangement of simplified parts for ease of manufacture and assembly. The shift shaft is mounted transversely in the transmission housing for axial selecting movement and rotary shifting movement and has a shift lever cooperating with closely adjacent forward shift members supported for axial movement near the nape at one side between the gears of the forward gearsets. The reverse shift member is pivoted on the shift shaft and extends from the shift lever on one side of the forward gearing, transversely across the forward gearing, to engage the reverse gearing on the other side of the forward gearing. The interlock member is supported on a moved axially with the shift shaft and held against rotary movement by an axial guide on the housing.

The transmission has parallel axial input and output shafts connected by forward drive gearing having a plurality of ratio gearsets, each having an input and an output gear associated respectively with the input and output shafts. In one pair of gearsets the input gears are fixed to the input shaft and the output gears are rotatable on the output shaft, and in the other pair of gearsets the input gears are rotatable on the input shaft and the output gears are fixed on the output shaft. The first and second pairs of gearsets have first and second synchromesh clutch devices to selectively clutch the rotatable gears to their shaft to selectively establish the ratio drive of each gearset. Each synchromesh device has a collar operative in a central neutral position to disengage both clutches for neutral, and shiftable in opposite directions to one and another shift positions to selectively engage one or the other gearset of a pair of gearsets.

This invention provides a transmission and internal shift linkage arrangement in which the external linkage transmits the selecting and shifting movement to a shift shaft mounted transversely in the housing and having a shift lever cooperating with forward shift members mounted for axial movement in the transmission housing and a reverse shift member pivotally mounted on the shift shaft. The selecting movement moves the shift shaft axially on its transverse axis when the shift shaft is in the rotary neutral position, and the shifting movement rotates the shift shaft about its axis from the rotary neutral position in opposite directions to first and second shift positions. A shift lever is secured to the shift shaft and has a lever portion with an end cam selectively cooperating with a recess in each of the shift members and a detent lever having detent grooves for the shift positions on each side of the central rotary neutral position. The shift lever is formed of sheet metal and has a central rectangular portion apertured to receive the shift shaft and a pin securing the shift lever for rotary and axial movement with the shift shaft, with one side extending to provide the shift lever with the end cam, and the opposite side extending to provide the detent lever with detent grooves. The shifting member or members are mounted for axial movement on an axial guide shaft fixed in the housing. The shift members are formed of sheet metal with a U-shaped body with the legs apertured to slidably mount the shift members on the guide shaft. One leg of each shift member extends to provide a shift fork engaging a shift collar of the synchromesh device to shift the collar between the shift positions on each side of a central neutral position and to prevent rotation of the shift member on the guide shaft. When two shift members are employed, one has a base sufficiently longer than the other so that each may be shifted to its shift position when the other is in the neutral position. The shift members have a lug projecting from the base of the U-shaped body portion toward the shift shaft and having a recess for cooperation with the end cam of the shift lever. A reverse shift member is pivotally mounted on the shift shaft and has a fork cooperating with the reverse idler gear for shifting between neutral and reverse positions. The reverse shift member is formed of sheet metal and has a U-shaped portion with the legs apertured to rotatably mount the reverse shift member on the shift shaft, with one leg extending as a fork on one side of the forward gearing for connection to the reverse idler gear, and the other leg extending on the other side of the forward gearing as a shift lug having a recess facing the shift shaft. The shift lugs are parallel and closely adjacent to each other, with the recesses aligned when each shift member is in neutral position. A rotary guide on the housing and reverse shift member prevents transverse axial movement along the transverse axis of the shift shaft of the reverse shift member. An interlock member is mounted on the shift shaft for transverse axial movement with the selecting axial movement of the shift shaft and has interlock cams located on each side of the shift lever end cam fitting into the recesses not occupied by the shift lever cam. A slide guide on the housing and the interlock member prevents rotary movement of the interlock member on the shift shaft. A spring detent is mounted on the interlock member and engages the detent grooves in the detent lever. The interlock member is formed of sheet metal and has a central rectangular portion with opposite walls located on opposite sides of the shift lever rectangular portion, and is apertured to receive the shift shaft so that the interlock member moves with the shift shaft during its axial movement. These opposite walls extend on opposite sides of the shift lever to provide the interlock cams extending parallel to the shift shaft and located in the recesses of the shift members which are in neutral position. The interlock member has an axially extending detent support which supports one end of a leaf spring detent so that its other end engages the detent grooves to detent the rotary shifting movement of the shift lever and shift shaft in the neutral and shift positions.

These and other features of the invention are described in the following description and accompanying drawing of a preferred embodiment, wherein.

The drive train is especially suitable for a transverse engine and transmission installation in a front wheel drive vehicle. The drive train in which the invention is used has a main clutch 10, transmission 11, and differential 12 mounted in housing 13 formed as an assembly having a clutch housing part 14 and a transmission housing part 16. The clutch housing part 14 has a bell housing portion 17 surrounding main clutch 10, an intermediate wall portion 18 which, with bell housing portion 17, encloses the clutch chamber 19. The wall portion 18 also encloses the open end of pot-shaped gear housing portion 20 providing gear chamber 21. The one-piece clutch housing part 14 has, extending transversely from bell housing portion 17 and wall portion 18, a connecting portion 22 which merges into the differential housing portion 23. The one-piece transmission housing part 16 has a circumferential wall 24 and an end wall 26 forming gear housing portion 20 enclosing gear chamber 21, a connecting portion 27 which merges into a differential housing portion 28. The clutch housing part 14 is secured to the engine block 29 by fasteners 31 at flange 32 of bell housing portion 17. Clutch housing part 14 has, adjacent intermediate wall portion 18, a sealing face 33 in sealing contact with a sealing face 34 of transmission housing part 16 and are secured together by fasteners 36 and locating pins 37 to secure and seal transmission housing part 16 to clutch part 14 so as to form gear chamber 21, the connecting chamber 38, and differential chamber 39. Connecting chamber 38, between connecting portions 22 and 27, connects gear chamber 21 to differential chamber 39 between differential housing portions 23 and 28, respectively, of clutch housing part 14 and transmission housing part 16.

Main clutch 10 has a backing plate 41 formed as a portion of engine flywheel 42 which is driven by engine shaft 43 in the direction of the arrow. A cover plate 44 is secured to flywheel 42 by fasteners 46. Plate spring 47 is centrally pivoted by annular pivot 48 secured to cover plate 44 and normally biases pressure plate 49 to engage driven plate 51 which is drive-connected to transmission input shaft 52, conventionally supported in a bearing bore of engine shaft 43. A ground sleeve 53 fits in an aperture 56 in intermediate wall portion 18 and has a flange 54 secured by fasteners (not shown) to intermediate wall portion 18. Clutch throw-out bearing 58 is actuated by clutch lever 59 to move on ground sleeve 53 to compress plate spring 47 to release main clutch 10.

Input shaft 52 is rotatably supported by bearing 61 supported in flange 54 secured to intermediate wall portion 18, and by bearing 63 fixed in recess 63 in end wall 26. Output shaft 64 is a sleeve shaft having a central through-bore 66 and is rotatably supported at the output end by bearing 67 fixed in recess 68 in off-set wall portion 69 of intermediate wall portion 18, and at the other end by bearing 71 fixed in recess 72 in end wall 26. Bearings 61, 62, 67, and 71 are tapered roller bearings, secured by a press-fit in the associated housing portion and on the associated shaft, and rotatably support input shaft 52 and output shaft 64 in spaced parallel relation to each other in the transmission housing part 16 and intermediate wall portion 18. A seal 73 in sleeve flange 54 engages input shaft 52 in back of bearing 61 to seal the clearance between ground sleeve 53 and input shaft 52, so wall portion 18 is sealed so as to conventionally seal gear chamber 21.

Forward gearing 74 has a 1st pair of gearsets 75 consisting of 1st and 2nd speed gearsets 76 and 77 respectively having input gears 78 and 79 fixed to, and preferably integral with, input shaft 52, and output gears 81 and 82 rotatably mounted by plain bearings on output shaft 64; and a 2nd pair of gearsets 83 consisting of 3rd and 4th speed gearsets 84 and 85 respectively having input gears 86 and 87 rotatably mounted by plain bearings on input shaft 52, and output gears 88 and 89 fixed by splines to output shaft 64. A 1st and a 2nd synchromesh device 91 and 92 are respectively located between the 1st and 2nd output gears 81 and 82 rotatable on output shaft 64 of the 1st pair of gearsets 75, and between the 3rd and 4th input gears 86 and 87 rotatable on input shaft 52 of the 2nd pair of gearsets 83. The 1st and 2nd synchromesh devices 91 and 92 respectively have 1st and 2nd shift collars 93 and 94 which are shown in the central neutral position (CN, FIG. 1) providing positive neutral. The 1st shift collar 93, on shifting movement from neutral position selectively to the right or toward output gear 81, in 1st ratio position (1st), engages 1st speed clutch 95 to clutch 1st speed output gear 81 to output shaft 64 to establish 1st ratio drive by 1st speed gearset 76, and to the left or toward 2nd speed output gear 82, in 2nd ratio position (2nd), to engage 2nd speed clutch 99 to clutch 2nd speed output gear 82 to output shaft 64 to establish 2nd ratio drive by 2nd speed gearset 77. The 1st and 2nd shift collars 93 and 94 function as actuators respectively for 1st and 2nd clutches 95 and 99 and for 3rd and 4th clutches 101 and 126.

The 2nd shift collar 94, on shifting movement from central neutral position (CN) selectively to the right toward 3rd speed input gear 86, in 3rd ratio position (3rd), clutches 3rd speed input gear 86 to input shaft 52 to establish 3rd ratio drive by 3rd speed gearset 84; and on movement to the left toward 4th speed input gear 87, in 4th ratio position (4th), clutches 4th speed input gear 87 to input shaft 52 to establish 4th ratio drive by 4th speed gearset 85. The 2nd synchromesh device has a hub 96 secured to the input shaft 52 between 3rd and 4th input gears 86 and 87. The 2nd device collar 94 has internal splines 97 mating with external splines 98 on cylindrical portion 113 of hub 96. External splines 98 and cylindrical portion 113 have the same axial length as internal splines 97 to support the collar 94 on the narrower hub 96 for the above-described axial shifting movement and rotation with the hub.

Figures 1, 2, 3, 4:
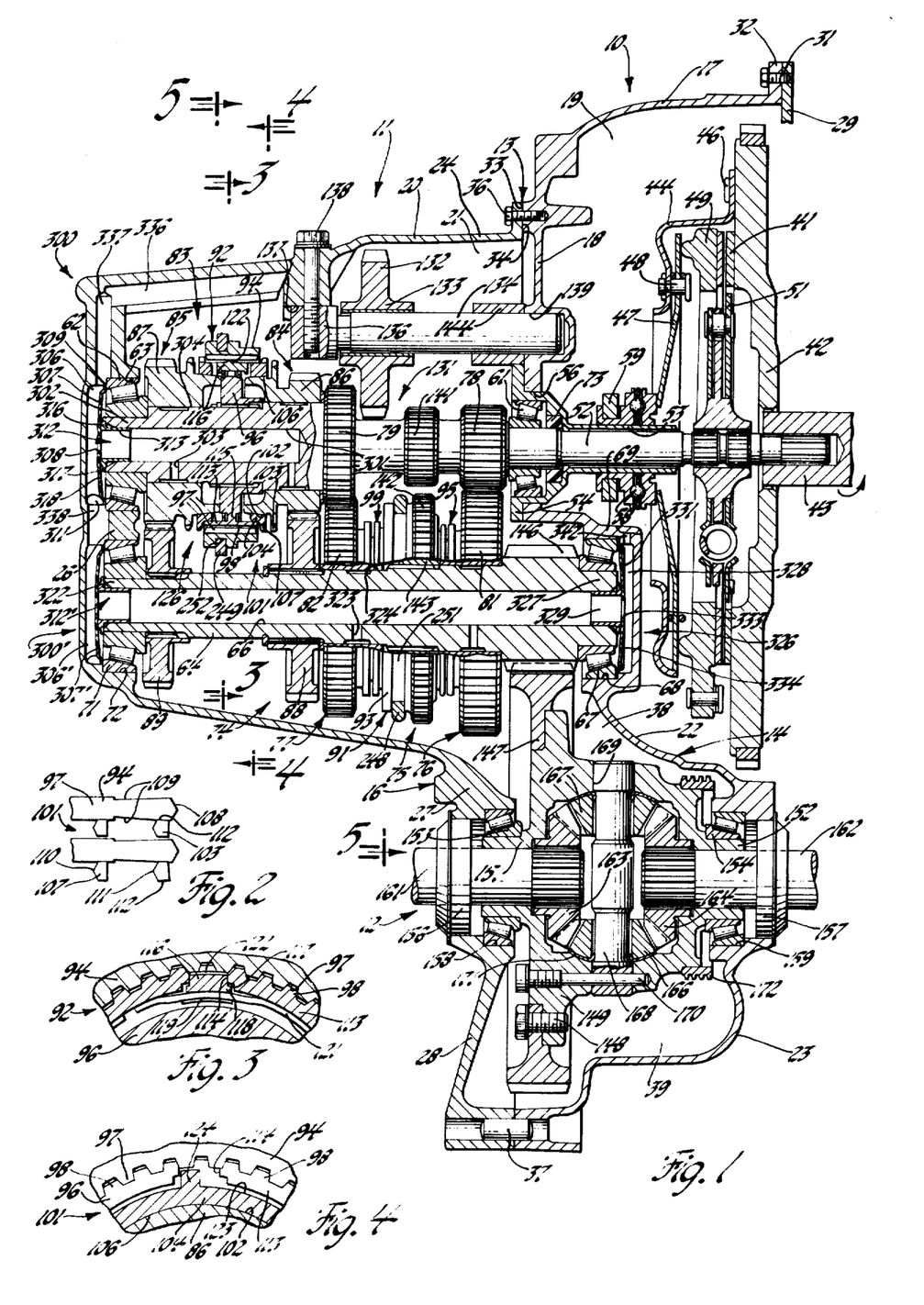
FIG. 1 is a developed sectional view of the drive train.
FIG. 2 is a partial enlarged developed view of the third synchromesh clutch splines and teeth in engaged position.
FIG. 3 is a partial enlarged sectional view of the hub and key on line 3—3 of FIG. 1.
FIG. 4 is a partial enlarged view of the hub and cone member on line 4—4 of FIG. 1.

The 3rd clutch 101 has an external friction surface 102 of conical shape and external clutch teeth 103 on the input gear 86 of 3rd speed gearset 84, and a cone member 104 having an internal friction surface 106 of matching conical shape engaging external friction surface 102 and external blocker teeth 107. As shown in FIG. 2, the internal splines 97 on 2nd shift collar 94 have chamfered ends 108 and straight oppositely tapered side portions 109. External blocker teeth 107 have axially straight sides and chamfered ends 110. External clutch teeth 103 have chamfered ends 111 and tapered sides 112 having the same taper as the contacted side portions 109. Chamfered ends 110 and 111 face chamfered ends 108 of internal splines 97. During drive engagement of 3rd clutch 101, as shown in FIG. 2, all the straight oppositely tapered side portions 109 on one side of internal splines 97 have surface engagement with the facing tapered sides 112 of external clutch teeth 103 to inhibit clutch disengagement.

External splines 98 are supported by cylindrical portion 113 of hub 96 which is wider than the inner portion 115 of hub 96. Hub 96 has three peripherally equally spaced grooves 114 in cylindrical portion 113 and adjacent narrow portion 115 of hub 96. A key 116 is slidably mounted in each groove 114. The grooves 114 (FIG. 3) have an axial recess 117 at each side, and keys 116 have axial side flanges 118 at each side fitting into recesses 117 to prevent radial outward movement and retain the keys in grooves 114 for axial sliding movement. Keys 116 have at each end an end flange 119 to retain a split ring spring 121 in contact with the inner surface at each end of all keys to bias the keys radially outwardly, so side flanges 118 seat in recesses 117. A detent 122, consisting of a central raised portion on keys 116 and central recess in the associated or all of the internal splines 97, functions during movement of 2nd collar 94 to move keys 116 with collar 94 to, on a shift to 3rd, initiate engagement of 3rd clutch cone member 104. The 3rd clutch cone member 104, as shown in FIG. 4, has an external cylindrical surface 123, located with clearance within cylindrical portion 113, and three equally circumferentially spaced lugs 124 formed integrally with the radial outer cylindrical portion and radial portion of cone member 104. Each lug 124 fits in a groove 114 with large clearance to permit rotary travel of cone member 104 relative to hub 96, so blocker teeth 107 rotate to establish synchronization for engaging 3rd clutch 101. Since lugs 124 extend the full axial width of cone member 104, the key 116 is short. The narrow portion 115 of hub 96 permits use of split ring springs 121 and obtaining the necessary movement of key 116 relative to hub 96. Keys 116 are thus fully within grooves 114 during the synchronizing phase when movement of 2nd collar 94 through detent 122 moves keys 116 to engage lugs 124 to move cone member 104 to engage external and internal friction surfaces 102 and 106 and to move internal splines 97 so their chamfered ends 108 coact with chamfered ends 110 of blocker teeth 107 to pass through the blocker teeth 107 to establish synchronization. Then, on a small further movement of 2nd shift collar 94, internal splines 97 move between clutch teeth 103. Due to the tapered contacting side portions 109 and sides 112 of the splines 97 and clutch teeth 103, only a small overlap is needed for antihop-out clutch engagement.

It will be seen in FIG. 1 that the 4th clutch 126 is the same as the 3rd clutch 101, but oppositely positioned, so reference is made to the above description of the 3rd clutch 101 for details and operation of 4th clutch 126. The 1st synchromesh device 91 includes 1st and 2nd speed clutches 95 and 99 and is like 2nd synchromesh device 92, so reference is made to the above description and the showing in FIGS. 1–4 of 2nd synchromesh device 92.

The reverse gearing 131 has a reverse idler gear 132 having a sleeve hub 133 slidably and rotatably mounted on reverse shaft 134. Reverse shaft 134 has at one end a securing portion 136 which is an enlarged cylindrical end portion seated in a shaft seat 137 of semicylindrical shape in circumferential wall 24 or gear housing portion 20 and secured therein by screw 138 extending through wall 24 and threaded into securing portion 136. The other end of reverse shaft 134 fits in a blind bore 139 in intermediate wall portion 18. Reverse idler gear is shown in the neutral position (N) where further or excess movement will be limited by securing portion 136 acting as a stop engaging sleeve hub 133. In neutral position (N), reverse idler gear 132 is located between 2nd speed input gear 79 and reverse input gear 141 in the nape of the input and output gears on one side of the forward gearing 74. On movement of reverse idler gear 132 from neutral (N) to reverse position (R), it first meshes with reverse input gear 141 fixed on input shaft 52, and then with reverse output gear 142 fixed on or integral with 1st collar 93 which is drive connected by hub 143, which is like the above-described hub 96, to output shaft 64. Excess movement of reverse idler gear 132 beyond reverse position (R) is limited by sleeve hub 133 engaging a stop ring 144 mounted on reverse shaft 134 and engaging intermediate wall portion 18.

In the gearing, input gears 78, 79, and 141 are fixed to input shaft 52 by integral construction. Output gears 88 and 89 are fixed to output shaft 64 by splines, since rotary output gears 81 and 82 must first be assembled on the output shaft 64 because output drive gear 146 is fixed by integral construction to output shaft 64. Output drive gear 146 directly drives differential gear 147 secured by fasteners 148 to differential cage 149. Output drive gear 146 and differential gear 147 are spur gears and extend through connecting chamber 38 formed by connecting housing portion 22 of clutch housing part 14 and transition portion 27 of transmission housing part 16. Cage 149 has, on the differential gear side and the other side, respectively, integral sleeves 151 and 152. Sleeves 151 and 152 are rotatably supported by bearings 153 and 154 and sealed by seals 156 and 157 respectively mounted in aperture 158 in differential housing portion 28 of transmission housing part 16, and aperture 159 in differential housing portion 23 of clutch housing part 14. Half-shafts 161 and 162 are respectively contacted by seals 156 and 157 rotatably supported in sleeves 151 and 152, and fixed by splines to bevel gears 163 and 164. Bevel gears 163 and 164 mesh with differential pinions 166 and 167, both mounted on pinion shaft 168, which is mounted in cross-bore 169 and secured in differential cage 149 by pin 170. Thrust washers 171 are located between each pinion 166 and 167 and cage 149. Speedometer gear 172 is fixed on cage 149.

Figure 5:
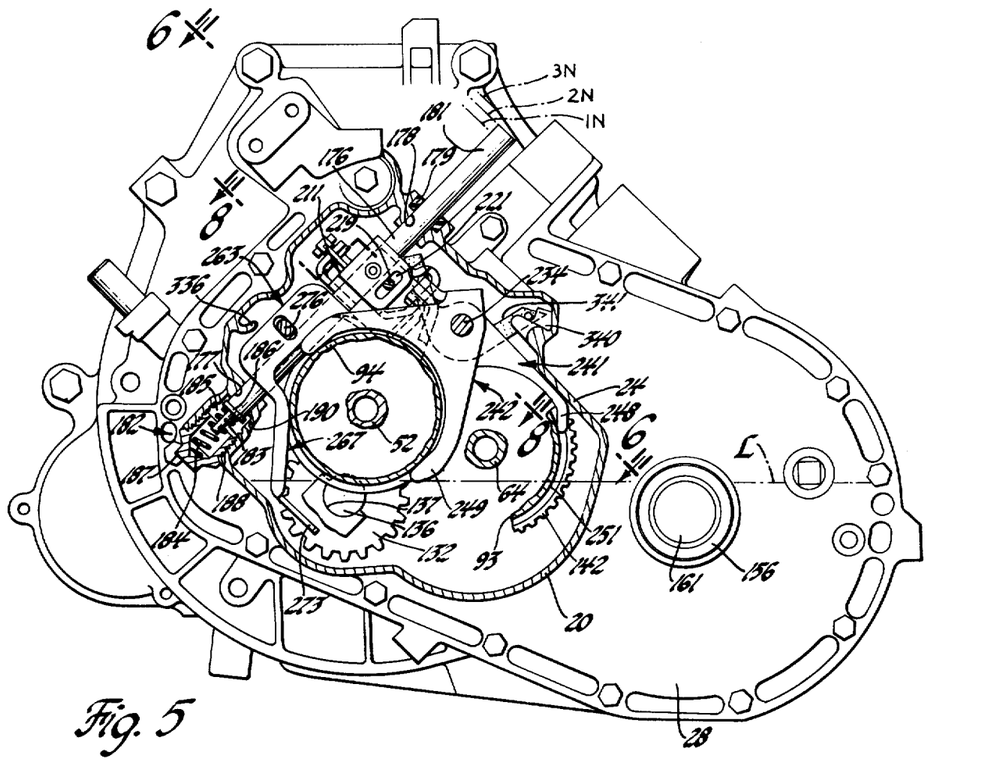
FIG. 5 is a sectional view of the drive train on line 5—5 of FIG. 1 showing the shift linkage.
Figure 6:
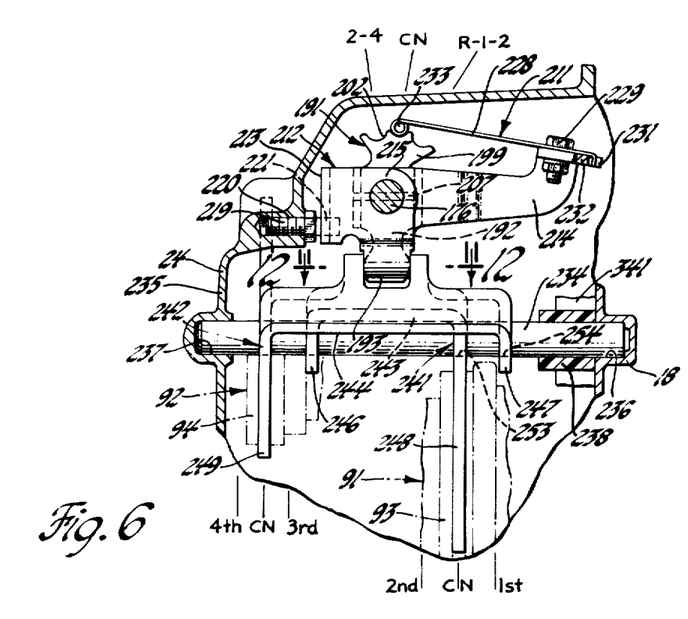
FIG. 6 is a partial sectional view on line 6—6 of FIG. 5 showing a portion of the shift linkage.

The internal shift linkage (FIGS. 5 and 6) has a shift shaft 176 having its axis extending transversely relative to the transmission longitudinal axis, the axis of input shaft 52, and extending transversely above and across forward gearing 74. Shift shaft 176 is transversely located centrally between 1st and 2nd synchromesh devices 91 and 92 and transversely above and adjacent to the input gears on input shaft 52. Shift shaft 176 is mounted in aligned bores 177 and 178 in opposite side wall portions of circumferential wall 24 of gear housing portion 20 (FIG. 5) for axial selecting movement and rotary shifting movement. Shift shaft 176 extends through bore 178 and seal 179 and has an external shift shaft portion 181 connected to a known external linkage (not shown) actuated by a manual lever 180. The known external linkage has manual lever 180 (FIG. 10) which is moved transversely for selection between 1st, 2nd, and 3rd neutral positions (1N, 2N, and 3N); moved forward from these neutral positions respectively for shifting to reverse (R), 1st, and 3rd drive positions; and move rearwardly from 2nd and 3rd neutral positions for shifting to 2nd and 4th drive positions. Manual lever 180 is operative through the external linkage connected to external shift shaft portion 181 to provide axial selecting movement of shift shaft 176 between corresponding 1st (1N), 2nd (2N), and 3rd (3N) neutral positions (FIG. 5), and to provide corresponding rotary shifting movement from a central neutral (CN) position (FIG. 6) in opposite directions to a 2nd and 4th position (2–4), or a reverse, 1st, and 3rd position (R–1–3). A reverse inhibitor 182 is located at the free end of shift shaft 176 beyond bore 177 and has a pin 183 secured to and extending beyond the end of shift shaft 176, a seat washer 186 on pin 183 abutting the end of shift shaft 176, a spring 184 guided on pin 183, located in chamber 185 having a vent 190 and seated on seat washer 186, and a plug 187 secured by threads 188 to circumferential wall 24 of gear housing portion 20. When the shift shaft 176 is in 2nd neutral (2N) position as shown in FIG. 5, the shift shaft 176, through seat washer 186, abuts spring 184 at its free height, so further movement of the shift shaft to 1st neutral (1N) position, necessary for a shift to reverse drive, is resisted or inhibited by spring 184.

Figure 7:
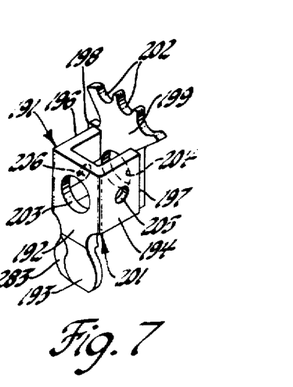
FIG. 7 is a perspective view of the shift and detent lever of the shift linkage.
Figures 8, 9, 10, 11, 12A, 12B, 12C, 12D:
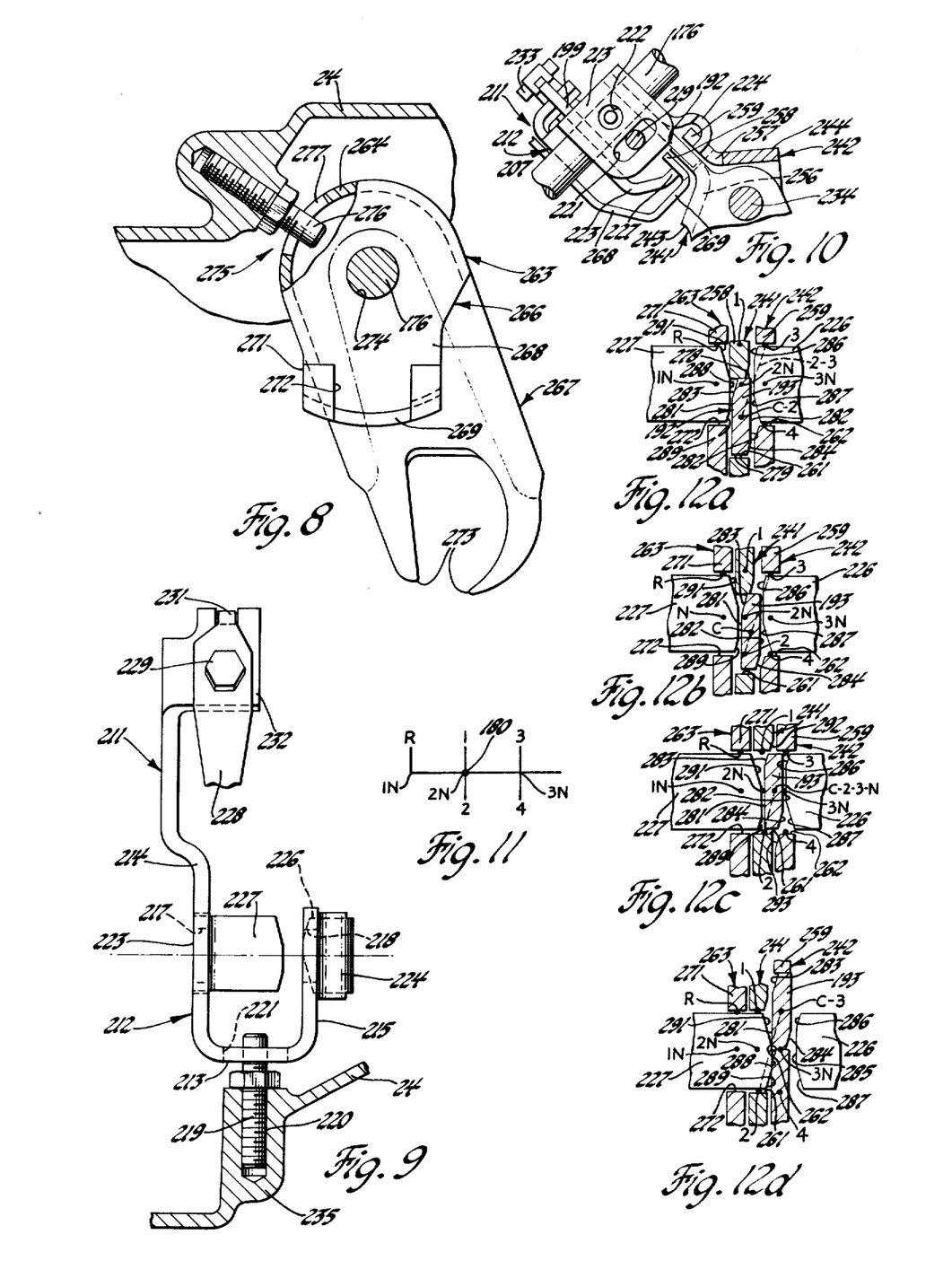
FIG. 8 is a partial sectional view taken along the plane of line 8—8 of FIG. 5 showing the reverse shift member.
FIG. 9 is an enlarged partial view of the interlock member.
FIG. 10 is an enlarged partial view of the shift shaft, shift lever, interlock member, and shift members.
FIG. 11 is a manual shift lever position diagram.
FIGS. 12a, 12b, 12c, and 12d, each being a sectional view taken along the plane of line 12—12 of FIG. 6, show the shift lever, shift members, and interlock member contacting portions in several positions during a 2-3 shift.

The lever member 191 (FIG. 7) has a shift lever 192 having an end cam 193, further described below with regard to the operation as shown in FIG. 11. Shift lever 192 has on opposite sides thereof ears 194 and 196 which are secured by welds 197 and 198 to the sides of a detent lever 199, forming a central rectangular portion 201 of lever member 191. Detent lever 199 has at its upper end three detent grooves 202 for the R–1–3, CN, and 2–4 positions of shift shaft 176 and lever member 191. Shift lever 192 and detent lever 199, in the rectangular portion 201, have aligned apertures 203 and 204 to receive shift shaft 176, and transverse apertures 205 and 206 in ears 194 and 196 to receive pin 207 which passes transversely through shift shaft 176 to secure lever member 191 to shift shaft 176 for conjoint rotary shifting and axial selecting movement to corresponding positions.

The interlock member 211 (FIGS. 5, 6, and 9) has a U-shaped portion 212 having a base 213, a long leg 214 and a short leg 215. Near base 213, legs 214 and 215 have apertures 217 and 218 to receive shift shaft 176. Legs 214 and 215 respectively contact shift lever 192 and detent lever 199 of shift lever member 191, so interlock member 211 moves axially with, but permits rotation of, shift lever member 191 and shift shaft 176. A slide guide 220 is provided by a pin 219 secured in an off-set portion 235 of circumferential wall 24 of gear housing portion 20 and extends axially into a slot 221 in base 213. Slot 221 extends axially with shift shaft 176 to provide slide guide 220 to prevent rotation of interlock member 211 about shift shaft 176, but to permit axial movement of interlock member 211 with shift shaft 176. Aperture 222 in base 213 permits access to pin 207 for disassembly. The long leg 214 and the short leg 215 have respectively a 1st and a 2nd interlock arm 223 and 224 (FIG. 10) extending radially away from shift shaft 176 and terminating in 1st and 2nd interlock cams 226 and 227 which extend parallel to shift shaft 176 from opposite sides of shift lever end cam 193 to close proximity with end cam 193 of shift lever 192. Interlock cams 226 and 227 and their operation are further described below with reference to FIG. 12. Detent leaf spring 228 is secured at one end by fastener 229 and tongue-and-slot 231 to ear 232 at the end of long leg 214. The other end of spring 228 is bifurcated and rotatably supports detent roller 233 to selectively engage the three detent grooves 202 of detent lever 199.

Guide shaft 234 is mounted in a blind bore 236 in wall portion 18 and a blind bore 237 in off-set portion 235 of circumferential wall 24, and has a ring stop member 238 thereon abutting wall portion 18. The 1st and 2nd shift members 241 and 242 are U-shaped members preferably formed of sheet metal and respectively have a base 243 and 244, a short leg 246 and 247, and a long leg or fork 248 and 249. The 1st and 2nd forks 248 and 249 respectively fit in grooves 251 and 252 (FIG. 1) in the 1st and 2nd shift collars 93 and 94, so 1st and 2nd shift members 241 and 242 respectively shift 1st and 2nd shift collars 93 and 94 to corresponding positions. The 1st shift member 241 has aligned apertures 253, one in each leg 246 and 248, near base 243, receiving guide shaft 234 to mount 1st shift member 241 on guide shaft 234 for axial shifting movement. The 2nd shift member 242 has aligned apertures 254, one in each leg 247 and 249, near base 244, receiving guide shaft 234 to mount 2nd shift member 242 on guide shaft 234 for axial shifting movement.

In 1st shift member 241, the length of base 243 and the spacing of leg 246 and fork 248 is shorter than the length of base 244 and the spacing of leg 247 and fork 249 of 2nd shift member 242, thus 1st shift member 241 fits within 2nd shift member 242 with sufficient clearance for shifting movement. The engagement of forks 248 and 249 respectively with diametrically opposed portions of grooves 251 and 252 in 1st and 2nd shift collars 93 and 94 prevents rotary movement of 1st and 2nd shift members 241 and 242 about guide shaft 234 and positions axially extending bases 243 and 244 so that their transverse sections are a near-median angle (e.g., 30° to 60°) between the transverse axis of shift shaft 176 and a perpendicular to shift and guide shafts 176 and 234, with their respective adjacent edges 256 and 257 closely adjacent each other and closer to shift shaft 176. The 1st and 2nd shift members 241 and 242 have respectively integrally formed 1st and 2nd connector lugs 258 and 259 extending from their adjacent edges 256 and 257 perpendicularly toward the transverse axis of shift shaft 176. Lugs 258 and 259 respectively have 1st and 2nd shift recesses 261 and 262 with the open side facing shift shaft 176. Each recess 261 and 262 has a rectangular shape with an axial length equal to the axial dimension of the shift lever end cam 193 and interlock cams 226 and 227 to receive end cam 193 and interlock cams 226 and 227 for shifting, as described below with reference to FIG. 12.

The 1st shift member 241 and shift collar 93 are shown in the central neutral (CN) position, placing 1st synchromesh device in neutral (N) position, and are shiftable in a low speed direction to 1st position (1st), placing 1st synchromesh device 91 in 1st drive position (1st) to establish drive by 1st speed gearset 76, and shiftable in a high speed direction to 2nd position (2nd), placing 1st synchromesh device 91 in 2nd drive position (2nd) to establish drive by 2nd speed gearset 77. The 2nd shift member 242 and shift collar 94 are shown in central neutral (CN) position, placing 2nd synchromesh device 92 in neutral position and are similarly shifted to 3rd position (3rd), placing 2nd synchromesh device 92 in 3rd drive position (3rd) to establish drive by 3rd speed gearset 84, and shifted to 4th position (4th), placing 2nd synchromesh device 92 in 4th position (4th) to establish drive by 4th speed gearset 85.

In this description, 1st and 2nd synchromesh devices 91, 92, shift collars 93, 94, shift members 241, 242, and associated parts are identified as "1st" and "2nd" in view of their normal order of use during upshifting. These same parts also may be respectively identified as "1-2" and "3-4" synchromesh devices 91, 92, shift collars 93, 94, shift members 241, 242, and associated parts, with reference to the ratio drives which they establish, and this identification is used in the description of the operation below. In this description, for brevity, the selecting movement positions are identified as "1st", "2nd", and "3rd" neutral positions, but from a functional viewpoint, are respectively identified as: reverse select position for reverse shifting; 1st forward select position for 1-2 shifting; and 2nd forward select position for 3-4 shifting.

Shift shaft 176 and shift lever 192 have conjoint axial selecting movement and rotary shifting movement to corresponding select and shift positions. Shift shaft 176, shift lever 192, and the selected one of shift members 241, 242, or 263, and respectively connected shift collars 93, 94, or idler gear 132 have conjoint shifting movement to corresponding positions.

Reverse shift member 263 (FIGS. 5 and 8) is a formed modified U-shaped member having a base 264 with a semicircular cross-section for increased strength in a small space around shift shaft 176 to provide a compact arrangement, an operating leg 266, and leg or fork 267. Operating leg 266 has a radial portion 268 and axial portion 269 relative to the axis of shift shaft 176, and at the end, a reverse lug 271 adjacent and parallel to 1st lug 258 and having a reverse recess 272 therein having an open side facing shift shaft 176, like 1st and 2nd recesses 261 and 262. Lug 271, 258, and 259 are mounted for substantially axial movement in parallel planes. Lugs 258 and 259 have straight-line axial movement, and lug 271 moves in an arc having a large radius which, in the small shifting movement arc, is substantially straight-line axial movement. These lugs are mounted with a small clearance space therebetween and may have a light contact for free, relative substantially axial movement. Fork 267 extends radially and axially adjacent the forward gearing 74 and terminates in a bifurcated fork portion 273 contacting the straight parallel sides of reverse idler gear 132 (FIG. 5) to shift reverse idler gear 132 between neutral (N) and reverse (R) positions. In the radial portion 268 of operating leg 266 and fork 267 adjacent and concentric with semicircular base 264, there are aligned apertures 274 receiving shift shaft 176 to pivotally mount reverse shift member 263 on shift shaft 176 for rotary shifting movement. Axial movement of shift meber 263 along the transverse axis of shift shaft 176 is prevented by rotary guide 275 consisting of pin 276, fixed in circumferential wall 24, and slot 277 in base 264 extending in a circular direction about shift shaft 176.

The operation of the above-described internal shift linkage for shifting the transmission gearing is now described, with additional reference to FIG. 12 showing four positions of the operating sequence on a 2-3 shift. Movement of an external control, such as manual lever 180, to the conventional modified "H" pattern positions shown in FIG. 11 correspondingly positions the internal linkage and shifts the transmission.

Transverse selecting movement of manual lever 180 between 1st, 2nd, and 3rd neutral positions (1N, 2N, 3N) correspondingly provides transverse selecting movement along the axis of shift shaft 176, shift lever 192, and interlock member 211 between 1st, 2nd, and 3rd neutral positions (1N, 2N, 3N; FIG. 5). The axial selecting movement force of shift shaft 176 is transmitted by press-fit pin 207 to rectangular portion 201 of lever member 191. Rectangular portion 201 fits with a small clearance between legs 214 and 215 of interlock member 211 to axially move interlock member 211 with shift shaft 176. End cam 193 of shift lever 192 of lever member 191 fits between 1st and 2nd interlock cams 226 and 227 with a slightly larger clearance, so force is not transmitted from shift lever 192 to interlock cams 226 and 227, and there is clearance for shifting movement of shift lever 192 and end cam 193. Movement of manual lever 180 from the appropriate neutral position in one direction (called a downshift direction) to reverse, 1st, and 3rd positions (R, 1st, 3rd), or in the opposite direction (called an upshift direction) to 2nd and 4th positions (2nd, 4th), correspondingly rotates shift shaft 176 and lever member 191 having shift lever 192 and detent lever 199 respectively in the downshift direction from the central neutral (CN) position (FIG. 6) to lower speed position, the reverse-1st-3rd position (R-1-3), or in the upshift direction to higher speed position, the 2nd-4th position (2-4). The selecting movement of shift shaft 176 is made with transmission 11 in neutral (N), with the reverse, 1st, and 2nd shift member recesses 272, 261, and 262 aligned, and is operative on selection of 1st (1N), 2nd (2N) and 3rd (3N) neutral positions to axially move and position end cam 193 of shift lever 192 respectively in reverse recess 272 of reverse shift member 263, 1st or 1-2 shift recess 261 of 1st or 1-2 shift member 241, or 2nd or 3-4 shift recess 262 of 2nd or 3-4 shift member 242. End cam 193 fits in these recesses with a small clearance for free axial movement and rotary shifting movement, when in the selected recess, to move the selected shift member without significant lost motion.

On selection of 1st neutral position (1N), 1st interlock cam 226 enters 1-2 and 3-4 recesses 261 and 262 to prevent shifting movement of 1-2 and 3-4 shift members 241 and 242 and, on shifting movement of shift lever 192 to R-1-3 position, end cam 193 in reverse recess 272, rotatably moves reverse shift member 263 to reverse (R) position, moving reverse idler gear 132 from neutral (N) position to reverse (R) position for reverse drive. On selection of 2nd neutral position (2N), 1st and 2nd interlock cams 226 and 227 are respectively in 3-4 and reverse recesses 262 and 272 to prevent shifting movement of 3-4 and reverse shift members 242 and 263 and, on shifting movement in a downshift direction of shift lever 192 to R-1-3 position, or in the upshift direction to 2-4 position respectively, axially moves 1-2 shift member 241 and 1st or 1-2 synchromesh device 91 to 1st or 2nd position to establish 1st or 2nd ratio drive. On selection of 3rd neutral position (3N), 2nd interlock cam 227 enters reverse and 1-2 recesses 272 and 261 to prevent shifting movement of reverse and 1-2 shift members 263 and 241 and, on shifting movement in the downshift direction of shift lever 192 to R-1-3 position, or in the upshift direction to 2-4 position respectively axially moves 3-4 shift member 242 and 2nd or 3-4 synchromesh device 92 to 3rd or 4th position to establish 3rd or 4th ratio drive. The 1-2 and 3-4 shift members 241 and 242 have axial shifting movement on guide shaft 234, and reverse shift member 263 has rotary shifting movement on shift shaft 176. Reverse idler gear 132 is located at the nape on one side of and between the input and output gears of reverse gearing 131 and forward gearing 74, and guide shaft 234 is located at the nape on the opposite side, between the input and output gears of forward gearing 74. The 1-2 and 3-4 shift members 241 and 242 have shift forks 248 and 249 projecting directly to adjacent 1-2 and 3-4 synchromesh devices 91 and 92. Reverse shift member 263 extends from its lug 271, located adjacent lug 258 of 1-2 shift member 241 on the opposite side of forward gearing 74, to shift shaft 176, concentric with shift shaft 176, transversely across the top of forward gearing 74, to the one side of foward gearing 74 and to reverse idler gear 132.

The FIG. 12 views 12a to 12d show the construction details of shift lever end cam 193, 1st and 2nd interlock cams 226 and 227, and the sequence of operation during a 2-3 shift providing straight-line 2-3 movement of shift lever 192, and thus straight-line movement of external manual lever 180 from 2nd to 3rd drive position for a rapid 2-3 shift. The center (point C) of shift lever end cam 193 is selectively moved to the neutral positions, 1st, 2nd, and 3rd neutral positions (N1, N2, N3), and shiftably moved to reverse and 1st-to-4th drive positions (R, 1-4) in the corresponding internal linkage positions (FIG. 12) which have the same arrangement as the corresponding positions (FIG. 11) of the external linkage and manual lever 180. Manual lever 180 and shift lever 192 move in an H-pattern with straight-line movement between 2nd and 3rd ratio drive positions.

FIG. 12a shows the shift lever end cam 193 in 1-2 recess 261 of 1-2 shift member 241 in 2nd ratio drive position, with 1st or lower ratio interlock cam 227 and 2nd or higher ratio interlock cam 226 respectively in reverse recess 272 and 3-4 recess 262 of reverse and 3-4 shift members 263 and 242. End cam 193 has, in cross-section, a modified rectangular shape with the short downshift and upshift ends 278 and 279 having a small clearance in 1-2 recess 261 and engaging one end of 1-2 recess 261 during movement and the long sides 281 and 282 located closely with clearance between 1st and 2nd interlock cams 226 and 227. Downshift end 278 and upshift end 279 are respectively the leading ends engaging a recess end surface on downshift movement to R-1-2 position, or upshift movement to 2-4 position of shift lever 192. Downshift side 281 and upshift side 282 are respectively the leading sides on axial selecting movement to a lower or higher neutral position of the 1st, 2nd, and 3rd neutral positions (N1, N2, N3). A downshift chamfer 283 and an upshift chamfer 284 are respectively provided at the corner between downshift end 278 and side 281, and between upshift end 278 and side 282. Chamfers 283 and 284 are about 15 degrees and remove about one-third of the end and side. Ends 278 and 279 and respective chamfers 283 and 284 are curved so that in all rotary positions of shift lever 192, end cam 193 and the chamfers maintain the same clearance in the recesses. The end wall corners of recesses 261 and 262 have respectively bevels 292 and 293 (FIG. 12c), of similar size to and facing chamfers 283 and 284. The other end wall corners of recesses 261, 262, and 272 are essentially square but are slightly rounded or beveled, so that such corners of the stamped shift members 241, 242, and 263 are finished and not sharp. The 1st or higher ratio interlock cam 226 has an end 285 having at the low ratio side a small bevel 286 and at the high ratio side a larger bevel 287. The 2nd or lower ratio interlock cam 227 has an end 288 having at the high ratio side a small bevel 289 and at the low ratio side a larger bevel 291. Chamfers 283 and 284 on cam end 193, bevels 292 and 293 on shift members 241 and 242, bevels 286, 287, 289, and 291 on interlock cam ends 285 and 288, and the combined shifting and selecting movement, along the straight line 2-3, have the same angle (e.g., 15°) relative to the plane of shift lever shifting movement which is parallel to the transmission longitudinal axis.

On a 2-3 shift from 2nd ratio position (FIG. 12a) to 3rd ratio position (FIG. 12d), the shift lever center C, with combined shifting and selecting movement, moves along the straight dotted line 2-3. FIG. 12b shows one position of initial shifting and selecting movement of shift lever center C between 2nd position (2), FIG. 12a, and 2-3 neutral position (N2-3), FIG. 12c, intermediate or half-way between 2nd and 3rd neutral positions (N2,N3) which, by contact of downshift end 278 of end cam 193 with 1-2 shift recess 261, moves 1-2 shift member 241 from 2nd position (2) to central neutral position (CN). During rotary 2-3 shifting movement from 2nd position (2) to 2-3 neutral position (N2-3), the large bevel 291 on 2nd lower ratio interlock cam 227 provides clearance relative to, and may engage, the adjacent corner of 1-2 shift recess 261 in 1-2 lug 258; and upshift chamfer 284 on shift lever end cam 193 provides clearance relative to, and may engage, the adjacent bevel 293 at the corner of 3-4 shift recess 262 in 3-4 shift lug 259 to permit and to guide shift lever 192 in the combined shifting and selecting movement, so shift lever center C moves along straight shift line 2-3. As shift lever end cam 193 moves through 2-3 neutral position (N2-3, FIG. 12c), downshift end 278 of end cam 193 ceases contact with 1-2 recess 261, due to chamfer 283 and bevel 292, and contacts 3-4 recess 262, due to the square corners, to move 3-4 shift member 242 from central neutral position (CN) toward 3rd ratio drive position (3rd). With continued movement of shift lever 192, its center C moves along line 2-3 from 2-3 neutral position (N2-3) through a position similar to that shown in FIG. 12b, with downshift cam end 278 engaging in 3-4 shift recess 262 to move 3-4 shift member 242 from central neutral position (CN) to 3rd position (3). Large downshift chamfer 283 provides the clearance relative to the bevel 292 of 1-2 recess of 1-2 shift member 241. Upshift chamfer 284 on end cam 193 and small bevel 286 on higher ratio interlock cam 226 provide clearance for shifting to 3rd position (3). On a 3-2 shift, this operation is reversed, with downshift chamfer 283 providing clearance relative to the adjacent bevel 292 of 1-2 shift recess 261 in 1-2 lug 258, and upshift chamfer 284 providing clearance relative to the adjacent bevel 293 of 3-4 shift recess 262 in 3-4 lug 259, for straight-line shifting.

The other one-step shifts (1-2, 2-1, 3-4, 4-3) also are straight-line shifts. Multistep shifts (1-4, 4-1) require axial selecting movement between the neutral position, so such a shift will not be made inadvertently. This is also required on a shift to reverse. Reverse selecting movement from 2nd neutral (N2) to 1st neutral (N1) is inhibited by reverse inhibitor 182, so a shift to reverse will not be made inadvertently.

The transmission (FIG. 1) has a lubrication system in which thrown lubricant or oil is collected in troughs and fed by gravity to chambers at the ends of the shafts for feed to the shaft bearings in the housing, and to bores in the shafts for a centrifugal feed to bearings on the shafts. An oil feed 300 (FIG. 1) is provided at the outboard end 302 of input shaft 52 to feed oil to bore 301 and bearing 62. Bore 301 extends from outboard end 302 of shaft 52 and is connected by radial passages 303 to bearings 304. There is at least one radial passage 303 for each of the bearings 304 supporting rotary input gears 86 and 87, for 3rd and 4th ratios, on input shaft 52. A chamber 306 for oil is located between end wall 26 and the bearing 62 and end 302 of input shaft 52. A shield 307, made of nylon or other suitable thermoplastic resin and having an annular conical shape (a Belleville spring shape), is located in chamber 306. Shield 307 has a central aperture 308 aligned with, and having a smaller diameter than bore 301. Shield 307, at its outer diameter peripheral edge 309, engages in sealing contact with the perimeter of chamber 306 adjacent bearing 62, and has several locating ears 311 spaced about the outer diameter to axially locate shield 307 in chamber 306 between end wall 26 and bearing 62. A sleeve 312, made of nylon or other suitable thermoplastic resin, has a cylindrical sleeve portion 313 with external ribs providing a tolerance accommodation for pressfitting and securing in bore 301, and a flange 316 in sealing engagement with the end face 317 of input shaft 52. Shield 307 is formed and functions like a Belleville spring and is prestressed during assembly, so an annular seal portion around central aperture 308 engages flange 316 with a low-pressure sealing engagement. A metering aperture 318, in shield 307 between the seal with flange 316 and the outer diameter, may be used to meter oil-flow to bearing 62. Central aperture 308 in shield 307 has an inner diameter less than the inner diameter of cylindrical sleeve portion 313, so sleeve 312 and shield 307 act cooperatively to dam and retain an annular body of oil in bore 301 during rotation of input shaft 52; so centrifugal force feeds oil through passages 303 to the central annular bearing space for uniform annular pressure feed to the plain bearing portions at each side of bearings 304.

The oil feed 300', at the outboard end 322 of output shaft 64, is like the above-described oil feed 300, so like reference numerals (primed) have been used and reference is made to the above description. If not resisted by counterflow, oil feed 300' feeds oil to bore 66 of output shaft 64 for centrifugal force feed through radial passages 323 to bearings 324, one for each of rotary output gears 81 and 82.

An oil feed 326 is located at the output end 327 of output shaft 64 and is constructed and arranged relative to output end 327 of output shaft 64, its bore 66, housing off-set wall portion 69, and bearing 67, similar to oil feed 300, as described above relative to input shaft 52. Oil feed 326 has a chamber 328 and sleeve 329 like chamber 306 and sleeve 312. Shield 331 is like shield 307 in that it has a central aperture 333, a metering aperture 334, and has sealing contact with the flange of sleeve 329, but the outer edge is located and sealed by an offset inner diameter portion of annular seal member 332 having its outer diameter sealed and secured by bearing 67 in recess 68. The gear chamber 21 is filled with lubricant or oil to level L (FIG. 5), and has known fill and drain ports with suitable closures (not shown).

An oil collecting trough 336 (FIG. 5) is formed or secured within gear housing portion 20, located above the axis of input shaft 52, and extends axially to provide portions in transverse alignment with the 3rd and 4th speed gearsets 84 and 85 to collect oil thrown by these gearsets which rotate in all ratio drives and overrun drive with the output shaft 64. Trough 336 is located above chamber 306 and connected by gravity oil feed passage 337 to chamber 306 to partially or fully fill chamber 306 for oil feed flow through metering aperture 318 to bearing 62, and through central aperture 308 in shield 307 to bore 301 in input shaft 52 to lubricate bearings 304 and further, if not resisted by counterflow, by gravity flow through passage 338 to chamber 306' for similar oil feed to bearings 71 and central bore 66 in output shaft 64. This oil feed flow originating at trough 336 will, if not overcome by counterflow, continue on to oil feed 326 at output end 327 of output shaft 64 and pass through central aperture 333 and metering aperture 334 in shield 331 to lubricate bearings 67.

Axial and transverse troughs 340 and 341 (FIG. 5) are secured on and/or formed in gear housing portion 20 and extend axially with portions transversely opposite the 1st and 2nd speed gearsets 76 and 77 and transversely opposite differential gear 147 to receive oil thrown by these gears. These troughs 340 and 341 are located above input shaft 52, highest chamber 306 and connected by passage 342, a gravity oil feed passage, to supply oil to chamber 328. Trough 341 collects a high volume of oil relative to vehicle speed since it collects oil thrown by large differential gear 147 which rotates when the vehicle is driven or coasting. Trough 340 also collects thrown oil whenever the engine, with main clutch 10 engaged, drives input shaft 52 to rotate the 1st and 2nd speed gearsets 76 and 77. Oil from troughs 340 and 341 feed-flows by gravity through passage 342 to chamber 328 and, if not opposed by counterflow, the oil passes through metering aperture 334 to bearings 67 and into bore 66 to be centrifuged through radial passages 323 to pressure-lubricate bearings 324 of 1st and 2nd speed gearsets 76 and 77. The oil feed-flows from chamber 328 through bore 66 to chamber 306', if not opposed by counterflow, to lubricate bearings 71 and, through passage 338 to chamber 306 to lubricate bearings 62 and 304, as described above.

The seal between sleeves 312, 312', and 329 and their associated shaft bore, and preferably also between these sleeves and their associated shield under static conditions, are preferably sufficient to retain oil in bores 66 and 301 for normal extended shut-down periods, so oil is available for lubrication on start-up. During running operation, any small leakage at these seals or a metered groove leak may supplement the preferred metered oil flow through the metering aperture (e.g., 318) to bearings (e.g., 67). Radial passages in the shafts like radial passages 323 could, if needed, be used to feed shaft support bearings.

It will be appreciated that modifications of the invention may be made.

What is claimed is:

1. In a control linkage for a multispeed transmission: a housing; gearing having first and second shift collars each selectively axially movable from a central neutral position in opposite directions to one and another drive positions; a guide member mounted axially in said housing; first and second shift members respectively having first and second connector abutment portions and first and second fork portions directly connected to said first and second shift collars and each shift member being mounted on said guide member for independent axial shifting movement from a central neutral position in one direction to one drive position and in the opposite direction to another drive position; a shift shaft mounted transversely in said housing for selecting movement along its transverse axis between first and second select positions and for rotary shifting movement from a central neutral position in one direction to one drive position and in the opposite direction to another drive position; a shift lever radially mounted on said shift shaft for corresponding movement with said shift shaft to corresponding positions and selectively directly connected respectively to said first and second connector abutment portions of said first and second shift members operative, when in said central neutral position, by selecting movement of said shift shaft and said shift lever to one of said first and second select positions, to respectively selectively directly engage one of said first and second connector abutment portions and operative on shifting movement to correspondingly shift the selectively engaged one of said first and second connector abutment portions to respectively shift said first and second shift members from said central neutral position to said one and another drive positions; an interlock member mounted on said shift shaft for conjoint transverse axial movement and to permit rotation of said shift shaft relative to said interlock member and having first and second interlock cam portions located transversely on opposite sides of said shift lever operative, when said shift lever is in said first select position to permit free shifting movement of said first shift member and to position said second interlock cam portion to directly engage said second connector abutment portion to hold said second shift member in said central neutral position and when said shift lever is in said second select position to permit free shifting movement of said second shift member and to position said first interlock cam portion to directly engage said first connector abutment portion to hold said first shift member in said central neutral position, and guide means on said housing and interlock member to prevent rotary movement and permit transverse axial movement of said interlock member.

2. The invention defined in claim 1, and said shift lever having a detent element fixed to and moving with said shift shaft having three detent grooves having the same position in said rotary shifting movement positions, central neutral position, and said one and another drive positions and detent spring means mounted on said interlock member which has transverse axial selecting movement with said detent element, resiliently engaging said detent grooves to resiliently detent hold said shift shaft and shift lever in said rotary shifting movement positions.

3. The invention defined in claim 1, and said interlock member having a U-shape with a base and spaced parallel legs having aligned apertures to rotatably mount said interlock member on said shift shaft and the inner facing sides of said legs engaging said shift lever for conjoint transverse axial selecting movement of said shift shaft, shift lever, and interlock member and said interlock cam portions being formed as transverse axially projecting portions of said legs.

4. The invention defined in claim 3, and each of said first and second connector abutment portions being a rectangular recess formed in an axial and adjacent portion of each of said first and second shift members having the open side of each said recess facing said shift shaft; said shift lever having an end cam selectively fitting in each of said recesses for conjoint shifting movement and said interlock cam portions fitting said recesses and being located on opposite sides of said end cam.

5. In a multispeed transmission: a housing; an input shaft and an output shaft rotatably mounted axially in said housing; gear means having two pairs of drive gearsets each having a clutch selectively engageable to provide a plurality of drives between said shafts; a guide member axially mounted in said housing; first and second shift member respectively having first and second connecting means and each being mounted on said guide member for independent axial movement from a central neutral position disengaging both clutches of one pair of clutches and movable in one direction to one shift position and in the opposite direction to another shift position to respectively engage one and another clutch of one pair; a shift shaft mounted transversely in said housing for selecting movement along its transverse axis between first and second select positions and for rotary shifting movement from a central neutral position in one direction to one shift position and in the opposite direction to another shift position; a shift lever radially mounted on said shift shaft for corresponding movement with said shift shaft to corresponding positions and operative when in said central neutral position by selecting movement of said shift shaft and said shift lever to one of said first and second select positions to respectively selectively engage one of said first and second connecting means and operative on shifting movement to correspondingly shift the selectively engaged one of said first and second connecting means to respectively shift said first and second shift members from said central neutral position to said one and another shift positions; interlock means mounted on said shift shaft for conjoint axial movement and to permit rotation of said shift shaft relative to said interlock means and having first and second interlock cams located on opposite sides of said shift lever operative when said shift lever is in said first select position to permit free shifting movement of said first shift member and to position said second interlock cam to cooperate with said second connecting means to hold said second shift member in said central neutral position and when said shift lever is in said second select position to permit free shifting movement of said second shift member and to position said first interlock cam to cooperate with said first connecting means to hold said first shift member in said central neutral position, and guide means on said housing and said interlock means to prevent rotary movement and permit transverse axial movement of said interlock means.

6. In a multispeed transmission: a housing; an input shaft and an output shaft rotatably mounted axially in said housing; gearing means including forward gear means having first and second forward gearsets on said shafts and clutch means having a clutch actuator having a central neutral position disestablishing both said forward gearsets and movable selectively in opposite directions to first and second positions to respectively establish first and second forward drive by said first and second forward gearsets between said shafts, and reverse gear means including an idler gear at one side of said forward gear means selectively movable between a neutral position disestablishing reverse drive and a reverse position establishing reverse drive between said shafts; a shift shaft mounted transversely in said housing extending from said one side to said forward gear means adjacent to and across to the other side of said forward gear means having a shift lever fixed to said shift shaft and located at said other side of said forward gear means and said shift shaft being selectively movable on its transverse axis between a forward position and a reverse position and rotatably movable for shifting movement from a central neutral position selectively in opposite directions to first and second positions and moving said shift lever to corresponding positions; forward shift member means mounted on said housing for axial movement adjacent said other side of said forward gear means operatively connecting said shift lever in said forward position to said clutch actuator for conjoint shifting movement between neutral and first and second positions for neutral, first, and second drives; reverse shift member means having a first portion on said one side of said forward gear means connected to said reverse idler gear, a second intermediate portion extending transversely across said forward gear means and pivotally mounted on said shift shaft, and a third portion connected to said shift lever in reverse position for conjoint shifting movement between said neutral position and one of said first and second positions for neutral and reverse drives, and rotary guide means on said housing and said reverse shift member means preventing transverse movement and permitting rotary movement of said reverse shift member relative to said shift shaft.

7. The invention defined in claim 6, and interlock means mounted on said shift shaft for rotation relative to said shift shaft and for conjoint transverse axial movement with transverse axial movement of said shift shaft and having locking means preventing rotary shifting movement of said reverse shift member means when said shift shaft is in forward position and preventing axial shifting movement of said forward shift member means when said shift shaft is in reverse position, and guide means on said housing and said interlock means to prevent rotary movement of said interlock means on said shift shaft and to permit transverse axial movement of said interlock means with said shift shaft.

8. The invention defined in claim 7, and detent means having a detent element, a detent member fixed for rotation with said shift shaft and having neutral, first, and second detent grooves and a detent spring mounted on said interlock means biasing said detent element into said detent grooves to detent said shift shaft in neutral, first, and second positions of shifting movement.

9. In a control linkage for a multispeed transmission: a housing; first and second shift members each having a lug with a recess therein and each being mounted in said housing for independent axial shifting movement with said lugs closely adjacent each other; said first shift member having a central neutral position, and on shifting movement in one and the opposite directions respectively having first and second positions; said second shift member having a central neutral position, and on shifting movement in said one and said opposite directions respectively having third and fourth positions; said recesses being transversely aligned when both shift members are in said central neutral position; a shift shaft having a radial shift lever with a rectangular end cam fitting each of said recesses and said shift shaft being mounted transversely in said housing for selecting movement along its transverse axis between first and second select positions when both said shift members are in said central neutral position to respectively selectively place said end cam in the selected one of said first and second recesses to select one of said first and second shift members, and operative on rotary shifting movement to correspondingly shift said shift lever and said selected one of said first and second shift members from said central neutral position to said one and another shift positions to in said first select position respectively provide first and second shift positions of said shift lever and first shift member and in said second select position respectively provide third and fourth shift positions of said shift lever and second shift member; interlock means mounted for conjoint axial movement with said shift shaft and having first and second interlock cams located on opposite sides of said shift lever operative when said shift lever is in said first select position to permit free shifting movement of said first shift member and to position said second interlock cam in said second recess to hold said second shift member in said central neutral position, and when said shift lever is in said second select position to permit free shifting movement of said second shift member and to position said first interlock cam in said first recess to hold said first shift member in said central neutral position; and shift guide means for straight-line shifting movement in a second-third shift path at an angle to the axis between said second and third positions of said shift lever including opposite corners having large chamfers parallel to said second-third shift path at said angle to the axis on said end cam facing the first and fourth shift positions, and said first and second interlock cams having chamfers at a similar angle to the axis at corners to provide a straight-line second-third shift path and H-pattern shifting between said first and fourth shift positions.

10. In a multispeed transmission: a housing; an input shaft and an output shaft rotatably mounted axially in said housing; gear means having first, second, third, and fourth forward drive gearsets each having a clutch selectively engageable to provide first, second, third, and fourth forward drives between said shafts; a guide member axially mounted in said housing; first and second shift members respectively having first and second closely adjacent lugs and recesses therein and each being mounted on said guide member for independent axial shifting movement; said first shift member in central neutral position disengaging said first and second clutches and drives, and on shifting movement in one direction engaging said first clutch and drive, and in the opposite direction engaging said second clutch and drive; said second shift member in central neutral position disengaging said third and fourth clutches and drives, and on shifting movement in said one direction engaging said third clutch and drive, and in the opposite direction engaging said fourth clutch and drive; said recesses being transversely aligned when both said shift members are in central neutral position; a shift shaft mounted transversely in said housing for selecting movement along its transverse axis between first and second select positions and for rotary shifting movement from a central neutral position in one direction to one shift position and in the opposite direction to another shift position; a shift lever radially mounted on said shift shaft for corresponding movement with said shift shaft to corresponding positions, having a rectangular end cam selectively fitting into said recesses when said both shift members are in said central neutral position by selecting movement of said shift shaft and said shift lever to one of said first and second select positions to respectively selectively place said end cam in the selected one of said first and second recesses, and operative on shifting movement to correspondingly shift the selected one of said first and second shift members from said central neutral position to said one and another shift positions to in said first select position respectively provide first and second shift positions and drives, and in said second select position respectively provide third and fourth shift positions and drives; interlock means mounted on said shift shaft for conjoint axial movement and to permit rotation of said shift shaft relative to said interlock means and having first and second interlock cams located on opposite sides of said shift lever operative when said shift lever is in said first select position to permit free shifting movement of said first shift member and to position said second interlock cam in said second recess to hold said second shift member in said central neutral position and when said shift lever is in said second select position to permit free shifting movement of said second shift member and to position said first interlock cam in said first recess to hold said first shift member in said central neutral position; and interlock guide means on said housing and interlock means to prevent rotary movement and permit transverse axial movement of said interlock means and shift guide means for straight-line shifting movement in a second-third shift path at an angle to the axis including opposite corners having large chamfers parallel to said second-third shift path at said angle to the axis on said end cam facing the first and fourth shift positions, and said first and second interlock cams respectively having large chamfers at the same angle on the opposite side of the axis at the corner facing the chamfered corners on said end cam in said central neutral position and having small chamfers parallel to said path at the other corners to provide a straight-line second-third shift path and H-pattern shifting between said first and fourth shift positions.

11. In a multispeed transmission: a housing; an input shaft and an output shaft rotatably mounted axially in said housing; gearing means including forward gear means having first and second forward gearsets on said shafts and clutch means having a clutch collar having a central neutral position disestablishing both said forward gearsets and movable selectively in opposite directions to first and second positions to respectively establish first and second forward drive by said first and second forward gearsets between said shafts; and reverse gear means including an idler gear at one side of said forward gear means selectively movable between a neutral position disestablishing reverse drive and a reverse position establishing reverse drive between said shafts; a shift shaft mounted transversely in said housing extending from said one side of said forward gear means adjacent to and across to the other side of said forward gear means having a shift lever radially fixed to said shift shaft and having an end cam located at said other side of said forward gear means, and said shift shaft being selectively movable on its transverse axis between a forward select position and a reverse select position and rotatably movable for shifting movement from a central neutral position selectively to shift positions and for moving said shift lever to corresponding positions; a guide shaft fixed in said housing extending axially adjacent said other side of said forward gear means; a forward shift member having a U-shape with a base and legs having aligned apertures to receive said guide shaft to support said forward shift member on said guide shaft for axial shifting movement, and one leg having a fork to engage said collar for conjoint axial shifting movement and to prevent rotation of said forward shift member on said guide shaft, said base having a lug extending axially and perpendicular toward said shift shaft, said lug having a forward recess with the open side facing said shift shaft and receiving said shift lever end cam when said shift lever is in said forward select position and operatively connnecting said shift lever in said forward select position to said clutch collar for conjoint shifting movement between said neutral and first and second positions for said neutral, first, and second forward drives; a reverse shift member having a U-shape with a first leg on said one side of said forward gear means terminating in a fork connected to said reverse idler gear for conjoint shifting movement, a second leg on said another side of said forward gear means, a base extending transversely across said forward gear means having a semicircular cross-section concentric with said shift shaft and connecting said first and second legs, said first and second legs having aligned apertures receiving said shift shaft to pivotally mount said reverse shift member on said shift shaft, and said second leg having a lug extending axially and perpendicular toward said shift shaft, said lug having a reverse recess with the open side facing said shift shaft and receiving said shift lever end cam when said shift lever is in said reverse select position for conjoint shifting movement between neutral position and reverse position for neutral and reverse drive; and rotary guide means on said housing and said reverse shift member for preventing transverse movement and permitting rotary movement of said reverse shift member relative to said shift shaft; interlock means having a U-shape with a base and first and second legs having aligned apertures receiving said shift shaft and said legs straddling said shift lever for mounting said interlock means on said shift shaft for conjoint axial movement and for permitting rotation of said shift shaft relative to said interlock means, first and second interlock cams depending from said first and second legs and being located on opposite sides of said shift lever end cam, operative when said shift lever is in said forward select position to permit free shifting movement of said forward shift member and to position said second interlock cam in said reverse recess to hold said reverse shift member in said central neutral position, and when said shift lever is in said reverse select position to permit free shifting movement of said reverse shift member and to position said first interlock cam in said forward recess to hold said forward shift member in said central neutral position; and interlock guide means on said housing and interlock means to prevent rotary movement and permit transverse axial movement of said interlock means.

* * * * *